United States Patent [19]
Derolf et al.

[11] 4,171,227
[45] Oct. 16, 1979

[54] ALUMINA-SILICA BINDER FOR COATING COMPOSITIONS

[75] Inventors: M. Robert Derolf, Pottstown; Eleftherios P. Katsanis, King of Prussia, both of Pa.

[73] Assignee: PQ Corporation, Valley Forge, Pa.

[21] Appl. No.: 870,557

[22] Filed: Jan. 19, 1978

Related U.S. Application Data

[63] Continuation-in-part of Ser. No. 744,490, Nov. 24, 1976, abandoned.

[51] Int. Cl.² ............................................. C09D 1/00
[52] U.S. Cl. ..................................................... 106/85
[58] Field of Search ............................ 106/65, 69, 85

[56] References Cited
U.S. PATENT DOCUMENTS 3,353,975 11/1967 Shannon et al. ...................... 106/65
4,047,965 9/1977 Karst et al. .......................... 106/65
4,069,057 1/1978 Kamei et al. ......................... 106/65

Primary Examiner—James Poer
Attorney, Agent, or Firm—Ernest G. Posner; Fred C. Philpitt; J. S. Stephen Bobb

[57] ABSTRACT

A binder system useful in formulating coatings for glass, metal, wood and especially light diffusive coatings for glass light bulb envelopes is disclosed. Excellent coatings can be formed using a binder system comprising dispersible colloidal particles of alumina and finely divided, precipitated silica. When a stable dispersion of these two materials is combined properly with a pigment and/or filler system and then dried upon a glass, metal or wood surface, a tough, continuous, tightly adhering coating is formed. By using the correct pigments, a light diffusive coating for light bulb envelopes can be formed.

14 Claims, No Drawings

ALUMINA-SILICA BINDER FOR COATING COMPOSITIONS

This application is a continuation-in-part of our co-pending application Ser. No. 744,490, filed on Nov. 24, 1976, now abandoned.

BACKGROUND OF THE INVENTION

Our invention is involved with the formation of a binder system for coatings on surfaces such as glass, metal or wood. In particular, our invention is directed toward a formulation for forming light diffusive coatings on light bulb envelopes utilizing a synergistic combination of colloidal alumina and finely-divided, precipitated silica.

The light emitted from incandescent light bulbs with clear glass envelopes is harsh and can be dangerous to the eyes. This condition has been alleviated by introduction of a means of diffusing light onto or upon the envelope. The most common method of providing light diffusion is to etch the inside of the glass envelope with fluoride ion. The process is dangerous, polluting, and the product is not particularly attractive since the etched glass is gray. Recently, bulbs have been produced with white coatings that are light diffusive. Such coatings are generally formed by attaching pigmentary particles to the glass utilizing electrostatic force. These coatings are considered to be only moderately successful, since they are not mar resistant. Small pieces of glass or even dirt tumbling and rolling within the envelope are sufficient to destroy the coating. For these reasons, handling and shipping of such coated envelopes on a large scale is impractical. The industry has need for a coating which is easy to apply, adheres well to the envelopes wall, is durable, has an attractive appearance and is low in cost.

SUMMARY OF THE INVENTION

We have developed a coating that can be applied to glass, metal or wood surface and which provides excellent light diffusive coatings when applied to the interior of light bulb envelopes. The binder system for this coating comprises a combination of a dispersible colloidal alumina and finely divided silica. The colloidal alumina, usually α-alumina monohydrate, is dispersed in an acid and then finely divided precipitated silica is blended into the alumina dispersion. This binder system is further blended with pigments, phosphors and possibly fillers to complete the coating formulation. High energy dispersion techniques such as colloid milling, ultrasonics, etc., render the dispersions indefinitely stable. The coating is preferably applied by drying thin films of the prepared composition on the desired substrate. Repeated coatings can be applied resulting in a tough layered coating.

A light diffusive white coating is applied to light bulb envelopes by filling or spraying the glass envelope with the binder and a pigment system which can include titanium oxide, draining and drying the envelope as quickly as possible. This procedure is repeated until the desired thickness of coating is obtained. Other coating systems utilizing various pigments and/or phosphors combined with the binder system can be used for different purposes or for light bulbs for varied service, including fluorescent tubes or cathode ray tubes.

THE INVENTION

Our invention consists of a two component binder system with which pigments and other additives can be blended to form coatings for a particular need.

Dispersible colloidal sized particles of alumina are required for this invention. Most forms of dispersible alumina can be used in the binder system of our invention, but we prefer to use α-alumina monohydrate. The most useful material appears to be that which is described in U.S. Pat. No. 3,935,023 to Derolf. The dispersions described in said patent are very useful in producing the binder composition of our invention. U.S. Pat. No. 3,935,023 is hereby incorporated by reference.

The other component of our binder system is colloidal sized silica such as that prepared by precipitation from sodium silicate. QUSO ®, a finely-divided precipitated silica produced by the Philadelphia Quartz Company, is especially useful in the composition and process of our invention. (QUSO ® is a registered trademark of the Philadelphia Quartz Company.) U.S. Pat. No. 3,208,823 discloses the preparation of silica from sodium silicate, which is particularly useful in this binder. U.S. Pat. No. 3,208,823 is hereby incorporated into this specification by reference.

A number of pigments, phosphors and/or fillers can be incorporated into the alumina-silica binder of our invention to complete the coating formulation. Any material that is relatively inert under mildly acid conditions appears to be useful. Some examples of useful pigments include iron oxides, carbon black, titanium dioxide, antimony oxide, cadmium sulfide, chromium oxide, zirconium oxide and similar materials. The white pigments are of the greatest interest for the coatings on light bulb envelopes so that titanium dioxide and antimony oxide are preferred for this application, although a yellow pigment such as cadmium sulfide can be used when preparing the so-called bug lights.

Fillers can also constitute part of the coating formulations using the alumina-silica binder of our invention. Again, any filler that is stable under the mildly acidic conditions of binder dispersion can be used in the coating compositions. Some examples of useful materials include calcium silicate, talc, silica gel, ground glass, and similar materials.

Naturally, other compatible additives may be included in the coating formulations for special applications.

The binder of our invention can be prepared as follows. A dispersion of finely divided alumina is formed by blending sufficient alumina to provide up to 25% $Al_2O_3$ solids with a mildly acidic solution. A previously prepared dispersion can also be used. The dispersion is diluted with water to the use level desired if necessary. Then silica is added in the amount required to interact with the alumina. This mixture is then subjected to intense mixing such as that provided by a colloid mill to complete preparation of the binder. Pigments and/or other coating components desired in the final product can be added prior to or after the intense mixing step.

There appear to be several important factors to be considered when preparing the binder composition of our invention. The colloidal alumina must be in a stable dispersion rather than in a simple suspension. We have obtained the best results with dispersions of α-alumina monohydrate. If the dispersions are prepared at 18 to 26% $Al_2O_3$ solids before diluting to the lower concentrations used in the binder system, they should contain 50 to 70 pbw of $Al_2O_3$ per pbw of HCl. If the dispersions are prepared at lower concentrations such as about 10–18% $Al_2O_3$, the dispersions should contain 20 to 50 pbw of $Al_2O_3$ per pbw of HCl. Other acids of monovalent cations such as nitric, acetic and formic, can be used and are considered equivalent to HCl. The concentration of the alumina and its relationship to the amorphous silica are very important factors in preparing binders that adhere to glass and are satisfactory for forming coatings on light bulb envelopes. The alumina dispersion should be prepared at or diluted to 1 to 23% $Al_2O_3$ solids to prepare the binder.

The most important factor in preparing binders of our invention that provide continuous and tenacious coatings is the synergistic interaction of the alumina and amorphous silica. If too little or no silica is present severe cracking and flaking of the coating results. Too much silica causes gelling of the binder. The synergistic interaction is found when about 2 to 20 parts by weight of $Al_2O_3$ are combined with 1 pbw of $SiO_2$. Another important factor in preparing stable and effective binders is the pH. We have found that mildly acidic conditions produce binders that produce excellent coatings. Additionally, we have found that the components of the binder should have particle shapes that are similar and the fiberous or plate like particles do not provide advantages.

By observing these relationships, binders of our invention are prepared that contain 1 to 22% by weight of dispersible colloidal $Al_2O_3$ particles with sufficient acid to stabilize the $Al_2O_3$; 0.1 to 11% by weight of finely divided silica having an ultimate particle size in the colloidal region, and the balance to 100% as water.

The amount of pigment used with the binder of our invention is generally dictated by the application for the coating. We have found that the pigment can comprise up to about the same weight of solids contained in the binder system. A combination of pigment and/or fillers can also be used. Therefore, the coating composition, utilizing the binder of our invention, will generally comprise: 0.9 to 20% dispersible alumina, sufficient HCl or equivalent acid to maintain the alumina in dispersion, 0.1 to 10.0% finely divided amorphous silica, 0.4 to 18.4% of pigment and/or filler and the balance up to 100% is water.

The coatings that can be prepared using our alumina-silica binder vary widely. They seem to be most effective on substrates that contain numerous negative sites such as glass, metal and cellulosic materials. Many synthetic polymeric materials may also benefit from the use of our binder system to form coatings thereon. At present, the most important application for coatings utilizing our alumina-silica synergistic binders appears to be the preparation of light diffusive, white coatings for light bulb envelopes. The coating formulation is obtained by preparing the binder as described, dispersing a portion of pigment in the binder, said pigment being selected from the group consisting of $TiO_2$, and $Sb_2O_3$. The pigment can be properly dispersed using high shear. The prepared coating composition is placed in the light bulb envelope and it can be allowed to remain in the envelope for some time. Generally, the most uniform coatings are obtained when the liquid composition is removed almost immediately. Upon removal of the liquid composition, a thin film remains which is dried as rapidly as possible without causing the formation of bubbles or other surface imperfections. We have placed the coating envelope in an oven at about 400° to 700° C. for a period of 8 to 45 seconds. These steps are repeated a plurality of times until the desired coating thickness is achieved. Depending on the ultimate use, as few as one layer and as many as 14 or more layers of the coating can be applied. The coating composition we have used successfully in this application comprises:

α-alumina monohydrate as $Al_2O_3$: 5 to 15%
Precipitated silica (7.5% moisture): 0.5 to 7.5%
$TiO_2$ (Pigment): 2 to 16%
Water: Balance to 100%

EXAMPLES

The following Examples illustrate certain preferred embodiments of our invention and we do not intend to limit the scope of our invention to these specific embodiments. The scope of our invention is fully recited in the claims forming part of this application. The proportions are in parts by weight (pbw) or percent by weight (%), unless otherwise noted.

EXAMPLE 1

A binder and coating composition was prepared according to the teaching of our invention and applied to a glass surface. A dispersion containing α-alumina monohydrate in an amount sufficient to provide 22% $Al_2O_3$ was prepared with HCl so that there was 60 pbw of $Al_2O_3$ per pbw of HCl by adding the dispersible α-alumina monohydrate to an aqeous solution of HCl. The alumina had an ultimate particle size of about 5 to 10 nm (nanometers) and contained about 10% surface water in addition to the water of crystallization. Water (300 pbw) was added to 150 pbw of the alumina dispersion so that 7.33% $Al_2O_3$ was now present. As this mixture was agitated 1 pbw of QUSO G ® 32 was added. (QUSO G ® 32 is a precipitated silica produced by the Philadelphia Quartz Company with a particle size in the colloidal range, a pH of 8.5 and a free moisture content of 7.5% at 105° C.). After the fine silica was added about ¼ of the material was cycled through a Premier Colloid Mill, Model LM-87 forming thereby a stable dispersion constituting the binder of our invention. 100 pbw of the alumina-silica binder was then blended with 5 pbw of cadmium sulfide. This blend was ball milled for ½ hour to assure complete dispersion of the pigment. A microscope slide was dipped into the yellow liquid and allowed to dry under ambient conditions. Two additional coats were applied in this manner. A uniform yellow coating was deposited on the glass surface. The coating appeared continuous even under magnification and was difficult to scratch.

A second 100 pbw portion of the binder was blended with 1 pbw of titanium dioxide. This material was cycled through the Premier Colloid Mill for 3 minutes. A sand blasted steel panel and a strip of plywood were painted using a brush. After drying at ambient conditions a second coat was applied. The dried white coatings were continuous and could not be removed by scraping.

The yellow coating material prepared previously was painted over a portion of the white coated steel panel and strip of plywood. The yellow coating was allowed to dry before recoating. A tough yellow top coat was formed which could not be removed by scraping.

The white coating material made with $TiO_2$ was poured into a glass incadescent light bulb envelope. It was immediately poured out and the envelope was dried by heating in an oven for 15 seconds at 500° C.

This cycle was repeated 6 times until a uniform tenacious coating was formed inside the envelope. Several glass beads were rolled around inside the envelope but the coating was not impaired. This coating diffused light in a satisfactory manner and an excellent incadescent bulb was prepared using the envelope.

This Example illustrates the preparation of coatings using the binder of our invention and several different applications of such coatings.

EXAMPLE 2

The remaining portion of unmilled binder material containing the alumina prepared as disclosed in Example 1 was utilized in this Example and blended with 2 pbw of $TiO_2$. This mixture was cycled theough the Premier Colloid Mill for 3¼ minutes to complete preparation of the coating composition. The material was poured into a glass incadescent light bulb envelope and immediately poured off. The coating was dried in an oven at 550° C. for 12 seconds. This cycle was repeated 8 times until a uniform tenacious coating was formed inside the envelope. This coating was equivalent to that formed as described in Example 1.

EXAMPLE 3

An alumina dispersion was prepared as described in Example 1 except that the concentration was 20% $Al_2O_3$ and there were 64 pbw of $Al_2O_3$ per pbw of HCl. This dispersion was diluted to 10.5% $Al_2O_3$. Then 20 pbw of a silica precipitated from sodium sulfate and sulfuric acid and suitably washed and dried to have a pH of 8.2 to 9.1% moisture loss at 105° C., was blended with 1000 pbw of the alumina dispersion. The material was passed through the Premier Colloid Mill for 8 minutes to form a uniform binder dispersion.

The binder dispersion, 100 pbw, was blended with 8 pbw of $TiO_2$ and ball milled for 6 hours. The coating composition was poured into a glass envelope and immediately removed. The coating was dried at 420° C. for 20 seconds. The cycle was repeated two additional times and light diffusive coating that was as satisfactory as that described in Example 1 was obtained.

EXAMPLE 4

A second 100 pbw portion of the alumina-silica binder prepared as in Example 3 was blended with 10 pbw of cadmium sulfide. This was used to prepare a yellow, light diffusive coating as described in Example 3. The coating was completely satisfactory.

EXAMPLE 5

A third 100 pbw portion of the alumina-silica binder prepared in Example 3 was blended with 5 pbw of $Sb_2O$ as a pigment and 6 pbw of talc as a filler. The blend was ball milled for 6 hours and the resulting dispersion used to coat a wooden chest. The coating was allowed to air dry and two coats sufficed to form an excellent flat white coating.

EXAMPLE 6

An alumina dispersion was prepared and diluted as described in Example 1 and a coating composition prepared as described in Example 2 except that no fine silica was added to the composition. The coating composition was poured into a light bulb envelope and immediately poured out. The envelope was placed in an oven at 500° C. for 15 seconds. The cycle was repeated 6 times, but the coating was not uniform. Large and numerous flakes had formed and did not adhere to the glass.

EXAMPLE 7

Two dispersion of QUSO G® 32 were made in mildly acid solutions. One contained 2% fine silica, the other 10% fine silica. To 100 pbw of each dispersion, 2 pbw of $TiO_2$ were blended and the resulting blends passed through the Premier Colloid Mill for 10 minutes. These compositions were tested as coatings for glass envelopes as described in Example 6. The coatings peeled off the glass when dried.

Examples 6 and 7 are included to be compared with the Examples illustrating the alumina-silica binder of our invention. This comparison shows clearly the synergistic nature of the alumina-silica combination, since neither component alone provides a satisfactory binding action.

We claim:

1. A stable binder composition useful in producing coatings on glass, metal and wood, comprising:
   (a) 1 to 22% by weight of dispersible colloidal particles of $Al_2O_3$ with sufficient acid to stabilize the $Al_2O_3$; said acid having a monovalent cation;
   (b) 0.1 to 11% by weight of finely divided precipitated silica having an ultimate particle size in the colloidal region, 1 part by weight of said silica being present for every 2 to 20 parts by weight of $Al_2O_3$; and
   (c) the balance to 100% as water.

2. The binder of claim 1 wherein the acid is selected from the group consisting of HCl, $HNO_3$, acetic and formic.

3. The binder of claim 2 wherein the acid is HCl and the composition contains 1 part by weight of HCl for every 20 to 70 parts by weight of $Al_2O_3$.

4. The composition of claim 3 wherein the binder contains 1 part by weight of HCl for every 50 to 70 parts by weight of $Al_2O_3$.

5. The binder of claim 1 wherein the alumina is α-alumina monohydrate.

6. The binder of claim 5 wherein the α-alumina monohydrate has 10% surface water and a particle size of about 5 to 10 nanometers.

7. A coating composition comprising:
   (a) 0.9 to 20% by weight of dispersible colloidal particles of $Al_2O_3$ with sufficient acid to stabilize the $Al_2O_3$; said acid having a monovalent cation;
   (b) 0.1 to 10% by weight of finely divided precipitated silica having an ultimate particle size in the colloidal region, 1 part by weight of said silica being present for every 2 to 20 parts by weight of $Al_2O_3$;
   (c) 0.4 to 18.4% by weight of one or more pigments and fillers selected from the group consisting of iron oxides, carbon black, titanium oxide, antimony oxide, cadmium sulfide, chromium oxide, zirconium oxide, calcium silicate, talc, silica gel and ground glass; and
   (d) the balance to 100% is water.

8. The composition of claim 7 wherein the acid is selected from the group consisting of HCl, $HNO_3$, acetic and formic.

9. The composition of claim 8 wherein the acid is HCl and the composition contains 1 part by weight of HCl for every 20 to 70 parts by weight of $Al_2O_3$.

10. The composition of claim 9 wherein the composition contains 1 part by weight of HCl for every 20 to 35 parts by weight of $Al_2O_3$.

11. The coating composition of claim 7 wherein the alumina is α-alumina monohydrate.

12. The coating composition of claim 7 wherein the α-alumina monohydrate has 10% by weight surface water and a particle size of about 5 to 10 nanometers.

13. A coating composition useful in preparing light diffusive coating for light bulb envelopes, consisting essentially of:
(a) 1 to 22% by weight of dispersible α-alumina monohydrate having about 10% surface moisture and a particle size of about 5 to 10 nanometers;
(b) 1 part by weight of HCl for every 20 to 70 parts by weight of $Al_2O_3$;
(c) 0.1 to 11% by weight of finely divided amorphous silica having an ultimate particle size in the colloidal range, said silica being precipitated from sodium silicate, said silica being present in an amount such that there is 1 part by weight of silica for every 2 to 20 parts by weight of $Al_2O_3$;
(d) 2 to 16% by weight of titanium dioxide; and
(e) the remainder to 100% water.

14. The composition of claim 13 wherein the composition contains 1 part by weight of HCl for every 50 to 70 parts by weight of alumina.

* * * * *